BEST AVAILABLE COPY
L. B. DOMAN.
SELF PLAYING MUSICAL INSTRUMENT.
APPLICATION FILED NOV. 25, 1910.
Reissued July 7, 1914.
13,764.
2 SHEETS—SHEET 1.
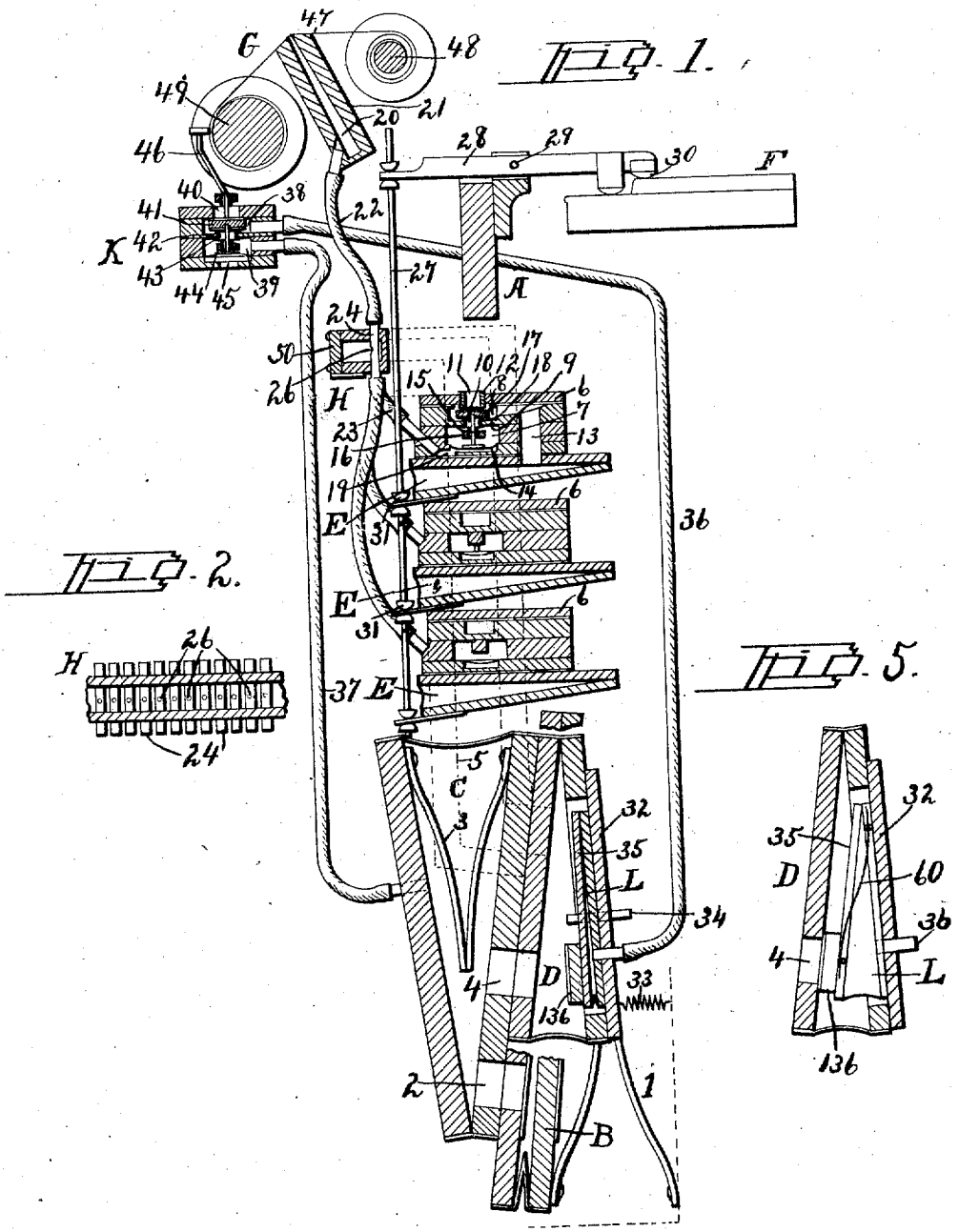
WITNESSES
E. J. Stout
K. E. Chase
INVENTOR
L. B. Doman
BY
Howard P. Denison
ATTORNEY

BEST AVAILABLE COPY

L. B. DOMAN.

SELF PLAYING MUSICAL INSTRUMENT.

APPLICATION FILED NOV. 25, 1910.

Reissued July 7, 1914.

13,764.

2 SHEETS—SHEET 2.

WITNESSES

S. J. Staub.

H. E. Chase

INVENTOR.

L. B. Doman

BY

Howard P. Denison

ATTORNEY.

BEST AVAILABLE COPY

UNITED STATES PATENT OFFICE.

LEWIS B. DOMAN, OF SYRACUSE, NEW YORK, ASSIGNOR TO THE AMPHION PIANO PLAYER COMPANY, OF SYRACUSE, NEW YORK, A CORPORATION OF NEW YORK.

SELF-PLAYING MUSICAL INSTRUMENT.

13,764. Specification of Reissued Letters Patent. Reissued July 7, 1914.

Original No. 927,454, dated July 6, 1909, Serial No. 212,674. Application for reissue filed November 25, 1910. Serial No. 594,228.

*To all whom it may concern:*

Be it known that I, LEWIS B. DOMAN, of Syracuse, in the county of Onondaga, in the State of New York, have invented new and useful Improvements in Self-Playing Musical Instruments, of which the following, taken in connection with the accompanying drawings, is a full, clear, and exact description.

This invention relates to pneumatic actuating means for musical instruments, especially pianos.

It is usual in mechanical playing attachments for pianos to employ pneumatic means consisting of an exhausting means, as a bellows, actuated by the operator or by mechanical means as may be desired, and which acts pneumatically upon a series of pneumatics or bellows each of which operates a key of the instrument. Various means have been proposed and are in use for regulating and controlling the pneumatic action, reference being made to my pending application #329,692, filed August 8, 1906.

It is the object of this invention to provide improvements in the control and regulation of the pneumatic action, and particularly in the tone-expression controlling-devices, as will be hereinafter set forth.

Figure 3:
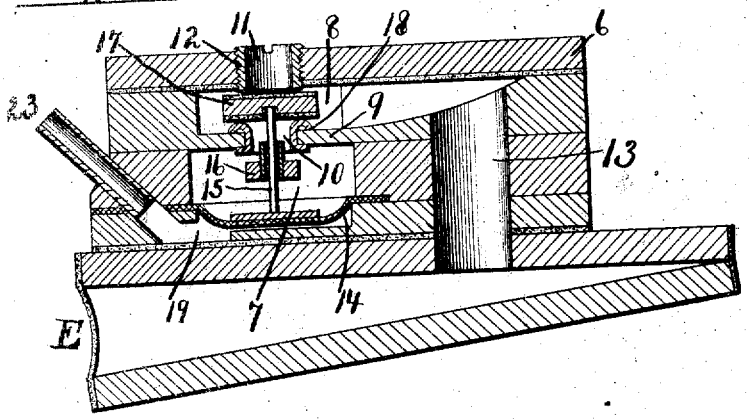
Figure 4:
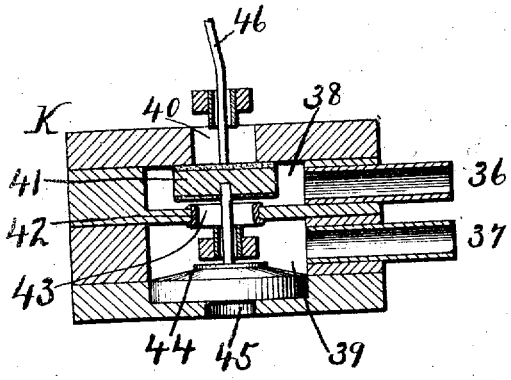

In the accompanying drawings, Figure 1 is a vertical transverse section of a mechanical piano player sufficient to show an embodiment of the invention; Fig. 2 is a vertical longitudinal section, broken away, of improved means for exhausting the tracker-board passages and connections; Fig. 3 is an enlarged sectional view of a pneumatic and its air chest; Fig. 4 is an enlarged sectional view of means for controlling the pneumatic action at will; and Fig. 5 is a side view of a part of the apparatus shown in Fig. 1.

The apparatus comprises a frame A, in which are mounted wind-inducing devices or exhausting means which may consist of main bellows B and may be actuated by the operator or by other suitable means, an equalizer or receiver, as bellows C, whereby the pressure upon the various parts of the apparatus is equalized, and a pneumatic regulator D, for controlling the pressure and connecting the equalizer C with sound producing devices or key pneumatics E each of which actuates one of the musical instrument keys or sound-producing devices F. The apparatus further comprises usual or suitable means whereby a perforated sheet controls the operation of the individual pneumatics, and a partially exhausted chest H through which pass pipes connecting the tracker board with the individual pneumatics, whereby these pipes are cleared of air after operation. It further comprises a means K for controlling the connections between the equalizer C and a pneumatic L mounted on the pneumatic regulator D, whereby the pressure in the pneumatic regulator D, and therefore the force with which the keys are struck, may be controlled promptly by the operator.

A spring 1 secured to the bellows B and bearing against the frame A, tends to collapse the bellows, which bellows may be moved in the opposite direction by any suitable means, as a treadle, and is provided with an outwardly-opening check valve, (not shown). This is a well-known construction and needs no further description. The equalizer C is in communication with the bellows B by means of an opening 2. A spring 3 tends to distend the equalizer C and holds it from collapsing as it is exhausted by the bellows B. The equalizer C is in communication with the pressure-controlling pneumatic D by an opening 4, and this pneumatic is connected by means of a conduit 5 with the chambers 7 of the air chests 6 of the individual pneumatics.

The individual pneumatics and their air or wind chests are precisely alike, so that a description of one of them will be sufficient. Each wind chest consists of walls inclosing chambers 7 and 8, separated by a partition 9 in which is an opening 10 through which the chambers may communicate. The chamber 8 communicates with the atmosphere by means of an opening 11 in which may be mounted the screw-threaded brass sleeve 12 for a purpose as will be hereinafter set forth. By means of a passage 13 the chamber 8 communicates with one of the individual pneumatics E. In the base of the chamber 7 is located a flexible diaphragm 14, on which is supported a valve stem 15 guided by the guide 16 fixed to the chamber wall. At its upper end the

BEST AVAILABLE COPY valve stem supports a valve 17 which is located within the chamber 8. This valve contains a recess upon its lower side for the reception of the valve stem, which recess is of sufficient size to permit universal movement of the valve about the stem so that it may readily adjust itself to its seat. The recess extends but a portion of the distance through the valve so that the point of support lies between its upper and lower faces. Preferably the valve is leather-faced, and to secure accurate seating of the valve, especially when the partition is of wood as is usually the case, the opening 10 in the partition between the chambers 7 and 8 is preferably fitted with a metal eyelet 18. The eyelet also serves to bind the edge of the hole. The travel of the valve may be accurately adjusted by screwing the sleeve 12 up or down. Beneath the diaphragm is a recess 19 which communicates with a duct 20 in the tracker-board 21 by means of flexible tubes 22 and 23, which are connected by a metal section 24 secured in the chest H, which chest is partially exhausted through a duct 25 which connects it with the pressure-controlling pneumatic D. A small hole 26 in the metal section 24 permits the exhaust of the air remaining in the recess 19 and its connected pipes and passages after an operation has taken place.

The movable member of each of the individual pneumatics E is connected by means of a rod 27 with a key hammer 28 pivoted at 29 in the frame A and having a felt striking face 30 adapted to strike one of the keys F. The rods 27 are secured to the hammers 28 and the bellows by means of suitable nuts 31.

The movable member 32 of the controlling pneumatic or pneumatic regulator D has a tendency to move outwardly under the influence of a spring 33 secured to the member 32 and to the frame A, while said member tends to move inwardly under atmospheric pressure due to the rarefication of the atmosphere within the pneumatic. A pin 34 fixed in the member 32 limits the collapse of the pneumatic. Upon the interior of the member 32 is hinged a member 35 forming the movable member of the small pneumatic L mounted upon the interior of the pneumatic D. The member 35 carries a valve 136 adapted to control the pressure in the pneumatic D by regulating the flow through the passage 4 as it is moved toward and away from the mouth of that passage. The actuator pneumatic L is connected with the equalizer C by means of flexible pipes 36 and 37 and the controlling means K. The valve 136 is actuated by the actuator pneumatic L and also by the regulator pneumatic D.

The controlling means K comprises walls inclosing chambers 38 and 39, into which the pipes 36 and 37 respectively open. An opening 40 provides a means of communication between the chamber 38 and the atmosphere, but this opening is normally closed by a valve 41 constructed and mounted in a manner similar to the valves 17, and similarly the valve 41 is adapted to be seated in its lowest position upon a metal eyelet 42, located in an opening 43 between the chambers 38 and 39. The under side of a diaphragm 44 is in communication with the atmosphere through an opening 45. As the chamber 39 is permanently in communication with the equalizer C, as shown, it is obvious that the diaphragm is normally forced upwardly and the valve 41 seated against the opening 40, so that the chambers 38 and 39 are in communication with each other and are shut off from the atmosphere, and therefore the interior of the pneumatic L and that of the equalizer C are connected together, and consequently the pneumatic L will be collapsed by the spring 60. The valve 41, however, may be moved downwardly to seat upon the metal eyelet by means of a thumb-piece 46, when the pneumatic L will be shut off from communication with the equalizer C and will be placed in communication with the atmosphere. The pneumatic L will then be distended and the valve carried by it moved toward the opening 4, and thereby restrict the flow therethrough.

The means G for actuating the perforated sheet 47 may consist of rollers 48 and 49 between which the sheet is passed over the end of the tracker-board, so as to shut off the passages 20 from the atmosphere except when a perforation in the paper registers with a passage.

The operation may be described as follows: The parts being in the positions as shown, when a perforation in the sheet 47 registers, with a passage 20, the atmospheric pressure introduced below the diaphragm 14, there being a vacuum in the chamber 8, will cause the diaphragm to move upwardly and the valve 17 to cut off communication between the chamber 8 and the atmosphere and place that chamber in communication with the chamber 7. The appropriate one of the individual pneumatics E having been thus connected with the exhaust apparatus, that pneumatic will collapse, thereby causing its connected hammer 28 to strike one of the keys F. The perforation having passed and the passage or duct 20 in question being again closed, the air in the chamber beneath the diaphragm 14 and in its connected passages will exhaust into the chamber H through the small hole 26. This hole should be of such size that the air will not exhaust through it with sufficient rapidity to prevent the air entering the tracker-board from raising the diaphragm 14 and the valve. For this reason the hole must necessarily be

BEST AVAILABLE COPY small and is liable to become clogged with dust and dirt, but the location of the pipe section in which it is formed being within the separated chamber H having a lid 50, this hole may be kept clear with small difficulty and without taking down a main air chest. The air having become exhausted in this manner from the chamber beneath the diaphragm, the latter will drop to its lowest position and thus the pneumatic E will be cut off from the exhaust apparatus and placed in communication with the atmosphere, whereby it will be distended and thus placed in readiness for a repetition of the operation. The movable member 32 of the pneumatic D will tend to move inwardly under atmospheric pressure against the tension of the spring 33. Such movement of the member will cause the valve 136 to approach the mouth of the opening 4, and it is obvious that the valve will maintain such position with relation to that opening that an air tension will be maintained in the pneumatic D and its connected passages which will depend upon the strength of the spring 33. The pin 34 prevents the member 32 from moving inwardly sufficiently to completely close the opening 4. The parts being in the positions as indicated, the pneumatic L will be collapsed and the apparatus will be acting under full tension. The strongest stroke, and therefore the loudest sound, which is possible with the existing degree of exhaustion of the equalizer C will then be obtained. The rate of operation of the exhausting means, as the bellows B, may be changed and thereby crescendos and diminuendos produced at the will of the operator. If, however, it is desired to produce a sudden change from loud to soft, this can be accomplished by pressure upon the thumb piece 46, which operates to place the interior of the small pneumatic L in communication with the atmosphere, while the connection with the equalizer C is cut off. The introduction of the atmospheric pressure into the pneumatic L operates to distend that pneumatic, when the valve 136 will be moved toward the opening 4, thus controlling the air tension in the pneumatic D and producing lighter blows upon the keys F. Upon the release of the thumb piece 46 the pressure of the atmosphere will cause the valve 41 to move upwardly and close the opening from the chamber 38 to the atmosphere and at the same time connect that chamber with the equalizer C. This will result in the reëxhaustion of the small pneumatic L, when the member 35, and with it the valve, will be retracted against the member 32 by means of a spring 60.

While I have described the controlling means K as being hand-operated, it will be obvious that it may be automatically operated as from the paper 47 by means similar to those employed in connection with the operation of the valves 17, or by other suitable means.

Other forms of expression control and accenting devices are shown in my pending applications #221,995 filed August 24, 1904, #249,250 filed March 9, 1905 and #329,692 filed August 8, 1906.

Without being limited to the precise construction shown and described, what I claim is:—

1. In a pneumatic action for musical instruments, the combination with sound-producing or key pneumatics, of means for exhausting said pneumatics, a pneumatic connected to said key pneumatics and said exhausting means, a second pneumatic carried by the movable member of the aforesaid pneumatic, and means for alternately connecting said second pneumatic with said exhausting means and with the atmosphere, substantially as described.

2. In a pneumatic action for musical instruments, the combination with sound-producing or key pneumatics, of means for exhausting said pneumatics, a pneumatic connected to said key pneumatics and said exhausting means, a second pneumatic carried by the movable member of the aforesaid pneumatic, and means for controlling the tension in said second pneumatic, substantially as described.

3. In a pneumatic action for musical instruments, the combination with sound-producing or key pneumatics, of means for exhausting said pneumatics, a pneumatic connected to said key pneumatics and said exhausting means, a second pneumatic carried by the movable member of the aforesaid pneumatic, means for controlling the tension in said second pneumatic, and a valve controlling the connection between the first said pneumatic and said exhausting means and carried by the movable member of said second pneumatic, substantially as described.

4. In a pneumatic action for musical instruments, the combination with a tracker-board, of sound-producing or key pneumatics and air chests therefor, pipes connecting said tracker-board and air chests, a separate chest located between said tracker-board and air chests, through which said pipes pass, said pipes having openings within said separate chest, and means for exhausting said separate chest, substantially as described.

5. In a pneumatic action for musical instruments, the combination with a tracker-board, of sound-producing or key pneumatics, of air chests therefor, pipes connecting said tracker-board and air-chests, each of said pipes comprising flexible sections and a metal section, a separate chest located between said air-chests and said tracker-board, and inclosing said metal sections, said

BEST AVAILABLE COPY metal sections having holes opening within said separate chest, and means for exhausting said chest, substantially as described.

6. In a self-playing musical instrument, a wind-inducing device and a sound-producing action connected thereto, a valve and a pneumatic actuator therefor for regulating the air tension in the sound producing action, and separate means for operating the valve.

7. In a pneumatic action for musical instruments, the combination with a normally distended pressure regulating pneumatic and means to exhaust the air therefrom, of a key action having an exhaust chest in communication with said pneumatic, a second pneumatic within the first named pneumatic for partially cutting off communication of said first named pneumatic with the exhausting means, and additional means to alternately connect the second pneumatic with said chest and with the atmosphere.

8. In a self-playing musical instrument, a wind-inducing device and a sound-producing action connected thereto, a tension regulating pneumatic communicating with the wind-inducing device, a valve actuated by said pneumatic for controlling the air tension in the sound-producing action, and means including an accenting pneumatic for operating said valve independently of the tension-regulating pneumatic.

9. In a self-playing musical instrument, a wind-inducing device and a sound-producing action connected thereto, a tension-regulator pneumatic forming a part of such connection, and an accenting pneumatic within the tension regulating pneumatic.

10. In a self-playing musical instrument, the combination with a sound-producing action, of means for regulating the air tension therein, including separately operable pneumatics one within the other.

11. In a self-playing musical instrument, a wind-inducing device and a sound producing action connected thereto and including therein an equalizer having an air port, a pneumatic covering said port and actuated by varying air tensions in said connection, a valve for the port actuated by said pneumatic and a separate accenting pneumatic for operating said valve independently of the first named pneumatic.

12. In a self-playing musical instrument, a wind-inducing device and a sound-producing action connected thereto, a valved air port communicating with the wind-inducing device, a valve for said port, an accenting pneumatic for actuating the valve and an additional pneumatic covering said port and operating under varying air tensions to additionally operate said valve.

13. In a self-playing musical instrument, a sound-producing action, a wind-inducing device having an equalizer connected to the sound-producing action, said equalizer being provided with an air port, a valve for the port, a pneumatic regulator covering the port and operating under varying air tensions to operate the valve, and an accenting pneumatic also acting upon the same valve.

In witness whereof I have hereunto set my hand.

LEWIS B. DOMAN.

Witnesses:
J. O. REDMOND,
E. J. STAUB.

Copies of this patent may be obtained for five cents each, by addressing the "Commissioner of Patents, Washington, D. C."